June 9, 1942.　　　H. N. RIDGWAY　　　2,286,011
TIRE CHAIN APPLIANCE
Filed March 5, 1941　　　3 Sheets-Sheet 1
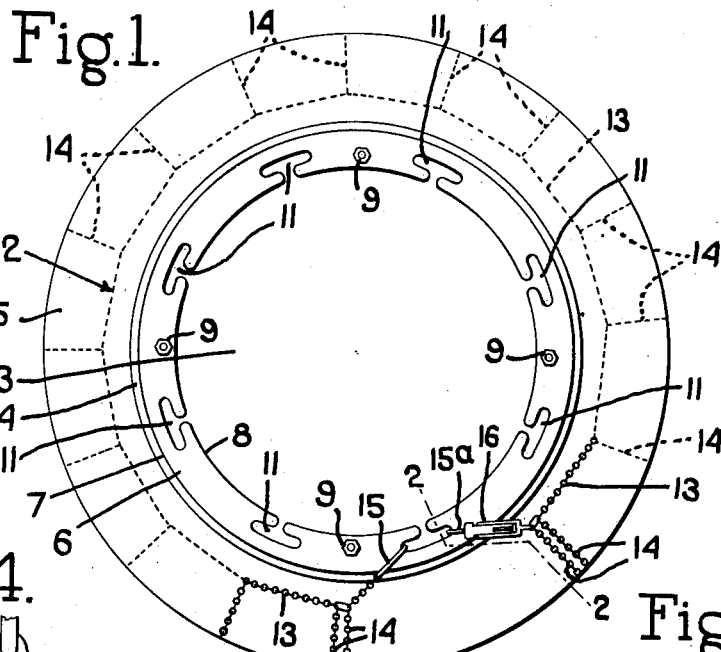
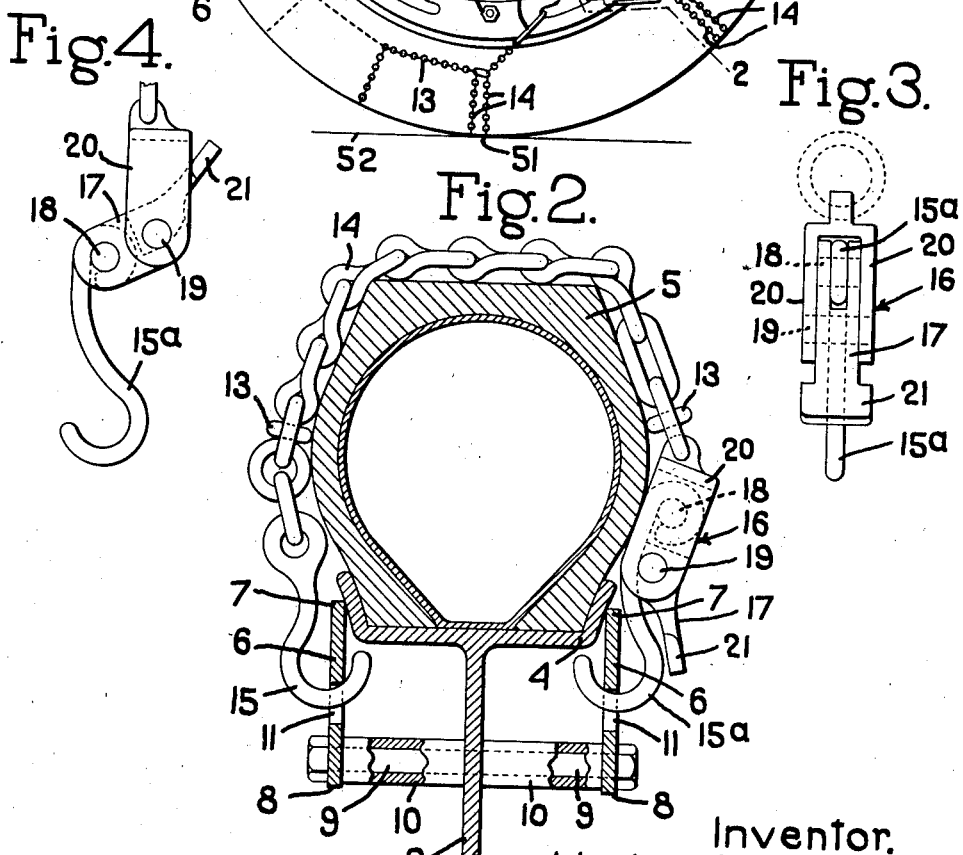
Inventor.
Herbert N. Ridgway
by Heard Smith & Tennant.
Attys.

June 9, 1942.  H. N. RIDGWAY  2,286,011
TIRE CHAIN APPLIANCE
Filed March 5, 1941   3 Sheets-Sheet 2
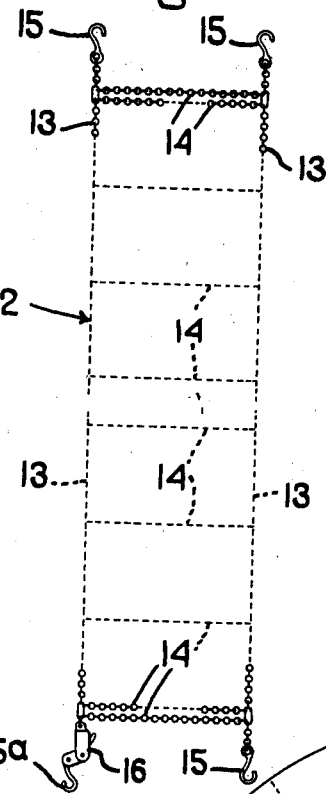
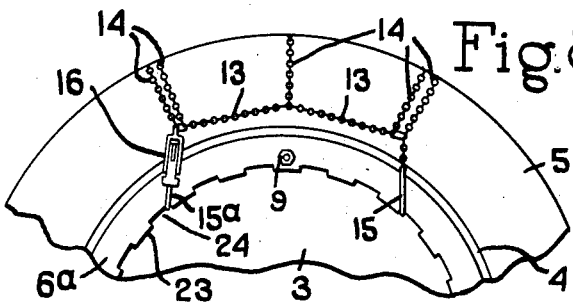
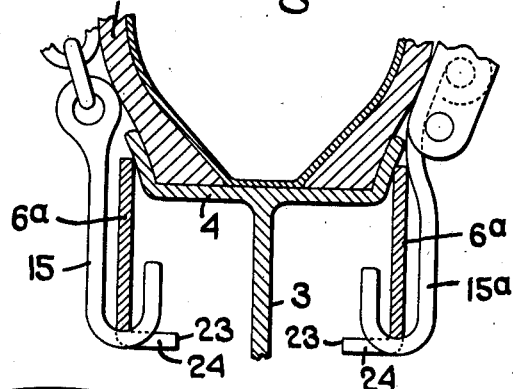
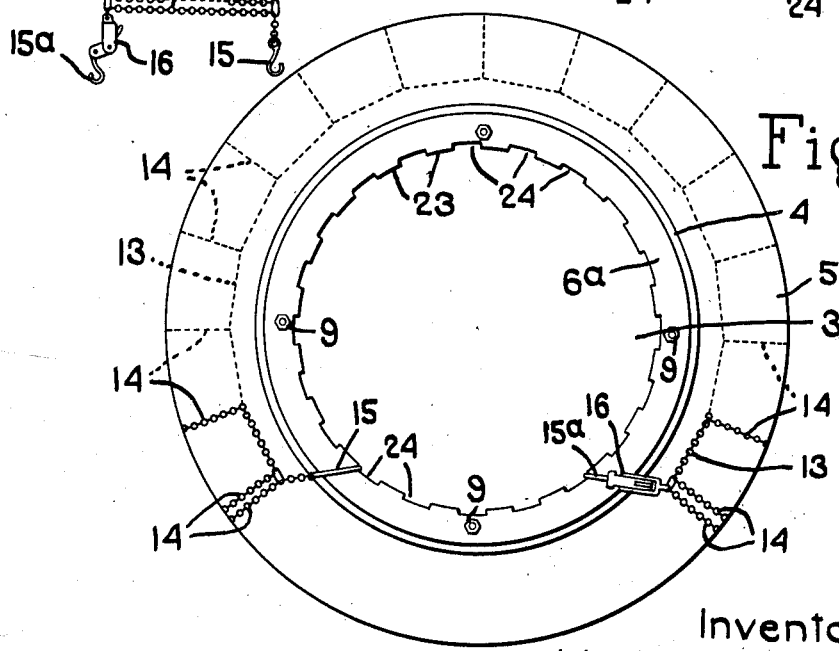
Inventor.
Herbert N. Ridgway June 9, 1942.  H. N. RIDGWAY  2,286,011
TIRE CHAIN APPLIANCE
Filed March 5, 1941  3 Sheets-Sheet 3
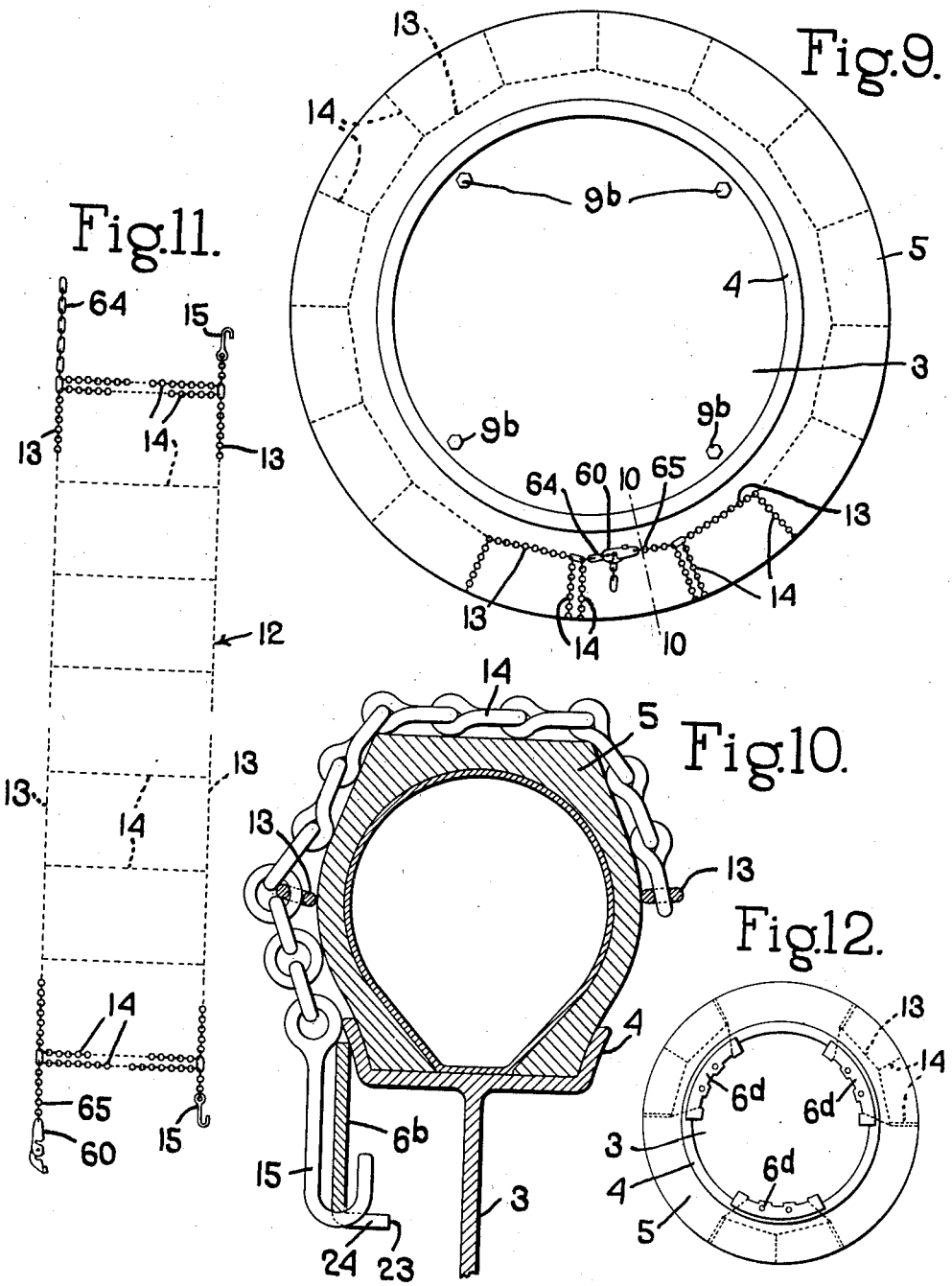
Inventor.
Herbert N. Ridgway
by Heard Smith & Tennant
Attys.

Patented June 9, 1942

2,286,011

UNITED STATES PATENT OFFICE 2,286,011

TIRE CHAIN APPLIANCE

Herbert N. Ridgway, Winthrop, Mass.

Application March 5, 1941, Serial No. 381,773

8 Claims. (Cl. 152—237)

This invention relates to non-skid tire chain appliances for vehicle wheels, and especially for automobile wheels, and the general object of the invention is to provide a novel anti-skid chain appliance which can be easily applied to any automobile wheel largely by a sense of feeling and without the necessity of jacking up the car.

My improved tire chain appliance includes one or more anchoring members, preferably in the form of rings, which are secured to the wheel adjacent the rim, and if two anchoring rings are employed, one will be situated each side of the rim. Each anchoring ring is provided with one or more notches or openings. The improved chain appliance also includes a tire chain member having two side chains connected by cross chains, the ends of at least one of the side chains being provided with hooks adapted to hook into some of the notches of the anchoring member.

The anchoring member or members may be secured to the vehicle wheel in any suitable way, and if desired, may remain attached to the wheel continuously, whether the tire chain member is to be used or not. The construction of the anchoring members is such that the chain member can be very easily hooked thereto or detached therefrom by the sense of feeling without the necessity of jacking up the car, thereby greatly simplifying the procedure of equipping an automobile tire with non-skid chains.

In the drawings, wherein I have illustrated some selected embodiments of my invention:

Fig. 1 is a side view of an automobile wheel having my improved chain appliance attached thereto.

Fig. 2 is an enlarged section on the line 2—2, Fig. 1.

Fig. 3 is a view of the toggle device by which certain of the hooks are attached to the chain.

Fig. 4 is a side view of the toggle device showing it open.

Fig. 5 is a view illustrating the chain element.

Fig. 6 is a fragmentary section similar to Fig. 2 but illustrating a different embodiment of the invention.

Fig. 7 is a side view of a wheel equipped with anchoring rings of the type shown in Fig. 6, said Fig. 7 showing a three-quarter length chain element.

Fig. 8 is a fragmentary view showing how a short chain element can be used.

Fig. 9 is a view illustrating a different embodiment of the invention.

Fig. 10 is a section on the line 10—10, Fig. 9.

Fig. 11 is a view illustrating the chain element used in the embodiment shown in Figs. 9 and 10.

Fig. 12 shows still another embodiment of the invention.

In the drawings, 3 indicates an automobile wheel of any usual construction which is provided with the rim 4 on which is mounted the pneumatic tire 5.

The improved anti-skid chain appliance, shown in Figs. 1 and 2, comprises two anchoring members 6, herein shown in the form of plate rings, which are secured to the wheel 3 on opposite sides of the rim 4. The anchoring rings 6 are shown as having their outer edges 7 resting against the tire rim 4 and the inner edges 8 extended inwardly somewhat beyond the tire rim 4. These rings may be bolted to the wheel or welded thereto or secured in place in any suitable way.

One way of securing these anchoring rings in position is by means of clamping bolts 9 which extend through the rings and through the wheel 3. I propose to employ spacing sleeves 10 between each ring and the body of the wheel 3 in order to hold the rings in proper parallel relation. These spacing sleeves are illustrated as encircling the clamping bolts 9.

Each anchoring ring 6 is provided with one or more stationary hook-anchoring portions, which are herein shown as notches formed in the inner edge of the anchoring ring. These hook-anchoring portions are adapted to receive the hooks on the ends of the side chains of the tire chain element, as will be presently described.

In Fig. 1, these notches are shown as T-shaped slots or notches and are indicated at 11. There may be any desired number of such notches formed in the inner edge 8 of each anchoring ring.

One form of tire chain member is indicated generally at 12 and is formed with two side chains 13 that are connected by suitable cross chains 14. Each side chain 13 has a hook at each end thereof which is adapted to be hooked into the notches 11, said hooks being indicated at 15 and 15a.

This tire chain member 12 may be of a length to extend entirely around the tire or may be of a length to extend only part way around the tire. In Fig. 1, the tire chain member is shown of a length to extend entirely around the tire, and the hooks at each end of the chain are hooked into the same notch 11.

In applying the chain to the tire, said chain may be laid on the road or floor surface 52 directly in front of the tire and then the hooks 15 on one end of the chain member can be hooked into those notches 11 in the anchoring ring 6 which are situated immediately in front of the point 51 at which the tire is resting on the road or floor surface 52, it being understood that the anchoring rings 6 are so applied to the wheel that the notches in each ring are situated directly opposite corresponding notches in the other ring.

The hook on the inside of the chain can be easily engaged in the notch 11 on the inside anchoring ring 6 by a sense of feeling. It is not necessary for the person applying the chain to be able to see this inside notch as he can readily reach around the tire and feel where the notch is and then slip the hook 15 into the notch. The corresponding notch on the outside anchoring ring 6 is, of course, in view so that the hook 15 on the outside of the chain can be easily hooked into said notch. The car is then rolled forward to roll the tire onto the end of the chain and to bring the notches 11 into which the chains are hooked on the rear side of the point 51 where the wheel rests on the road or floor surface, as shown in Fig. 1.

The chain can then be placed around the tire and the hooks 15 on the other end of the chain may then be readily hooked into the same notches 11 as that in which the first-named hooks were engaged. In thus attaching the hooks to the anchoring rings, it is preferable to attach the hook on the inside of the chain first, and this can readily be done by a sense of feeling. The hook 15 on the outside of the chain is then engaged in the notch 11 and the chain is thus securely attached to the tire.

If the chain has a length less than the circumferential dimension of the tire, then it will be possible to apply the chain to the tire without even moving the automobile on the road surface. If, for instance, the chain is of the three-quarter length, shown in Fig. 7, then the chain may be draped over the wheel with the hooks hanging down both in front and in back of the wheel, and then the hooks on the front end of the chain may be hooked into notches 11 that are located in front of the point 51 where the tire rests on the road surface, and the hooks at the other end of the chain may be hooked into notches on the rear side of the wheel. In this applying the chain, the hooks on the inside of the wheel can very easily be engaged in the notches entirely by the sense of feeling, thus making it unnecessary for the person putting on the chains to take a position on the ground when he can see the notches on the inside of the wheel.

It is an advantage to have a tire chain fit the tire rather snugly, and I have, therefore, provided my improved chain with means for taking up the slack therein after it has been attached to the anchoring rings. I provide for this by the use of a toggle lever connection between the hook 15a and the side chain. Such toggle connection is illustrated at 16, and it comprises a member 17 to which the end of the hook 15a is pivotally connected, as shown at 18, and which, in turn, is pivotally connected at 19 to two links 20 that are connected to the end of the side chain 13. When the toggle is open, as shown in Fig. 4, the pivotal point 18 between the hook 15a and the member 17 occupies a position beyond the pivotal point 19 between said member 17 and the links 20. By swinging the member 17 from the open position shown in Fig. 4 to the closed position shown in Figs. 2 and 3, the pivotal point 18 between the hook 15a and the member 17 will be carried into a position between the pivotal point 19 and the end of the side chain, and by this operation, the effective length of the side chain will be reduced somewhat.

In swinging the member 17 from its open position, shown in Fig. 4, to its closed position shown in Fig. 2, the pivotal point 18 is carried slightly beyond the line joining the pivotal point 19 and the end of the side chain, so that the pulling strain on the hook 15a holds the toggle member in its locked condition.

The member 17 is provided with a thumb piece 21 by which it may be manipulated and which also acts as a stop to engage the hook when the toggle is locked in its position.

While one or more of the toggle members may be employed, yet a single toggle lever at one end of the outside side chain 13, as shown in Fig. 5, may be sufficient. In such case, the hooks at both ends of the inside side chain 13 will be plain hooks, and these can be readily hooked into the appropriate notches on the inside of the wheel entirely by a sense of feeling. After the plain hook 15 on one end of the outside side chain has been hooked into its notch, then the chain element may be manipulated if necessary on the tire to cause it to hug the tire tightly, and after the hook 15a has been hooked into a notch, the closing of the toggle will take up slack in and tighten the chain.

Instead of using a single chain element such as shown in Figs. 1 and 7, I may employ two or more short chain sections, each having a pair of hooks at each end. These short sections may be readily applied to the tire as above described and as illustrated in Fig. 8.

In Figs. 6 and 7, I have illustrated anchoring members 6a which are provided on their inner edges with a plurality of inwardly extending projections 23, the spaces 24 between such projections constituting the notches into which the hooks on the end of the side chain are engaged. With this arrangement, the hooks 15 on the ends of the chain element are merely hooked over the edge of the anchoring ring 6a between the projections 23, and the latter serve to hold the hooks in place.

Although I have shown the anchoring members as in the form of rings, yet the invention would not be departed from if the anchoring members were in the form of segments of rings which extend only part way around the wheel, as shown in 6d in Fig. 12. Any desired number of these segments 6d may be attached to the wheel, and in Fig. 12, I have shown three segments. If a chain of a length to extend entirely around the tire were used, then a single segment would be sufficient, but if the chain element is in the form of short sections, such as shown in Fig. 8, and also in Fig. 12, then it might be desirable to have two or three or more of these anchoring segments attached to the wheel.

An advantage of using the anchoring members in the form of rings is that there will always be notches 11 or 24 conveniently located in front of and in back of the point of contact between the wheel and the ground into which the ends of the chain element can be conveniently hooked without moving the automobile.

Instead of using two anchoring rings, one on each side of the wheel, I may employ a single anchoring ring only, indicated at 6b in Fig. 10 and situated on the inside of the wheel. This anchoring ring will have its outer end resting against the rim 4 of the wheel and will be secured to the wheel by clamping bolts 9b, shown in Fig. 9, and said ring will have notches on its inner edge, as illustrated in the other figures of the drawings.

In this embodiment of the invention, the tire chain will be made on one side with a hook 15 at each end, which hooks are intended to be hooked into the notches in the ring 6b. On its other side the chain may have any usual toggle connections, indicated at 60 for detachably fastening the ends of the chain together. When this embodiment of the invention is used, the chain will be draped over the wheel, and the operator may reach around on the inside of the wheel to attach the hooks 15 at the ends of the chain on the inside thereof to the notches in the anchoring ring 6b, and, as stated above, this may be done entirely by the sense of feeling. Both hooks may be hooked into the same notch, or they may be hooked into adjacent notches, as most convenient.

The chain will then be worked over the tire toward the outside thereof until it is tight, and then the two ends 64, 65 of the side chain on the outside of the wheel may be fastened together by any usual toggle fastening device 60.

I claim:

1. A tire chain appliance for vehicle wheels having a rim and a tire mounted thereon, said appliance comprising two anchoring rings, means attaching said rings to the wheel, one on each side of the rim, each ring having notches in its inner edge, a tire chain adapted to engage the tread portion of the tire, said tire chain having two side chains extending the length thereof and cross chains connected at their ends to the side chains, each side chain having at each end a hook to hook into a notch of the corresponding anchoring ring, and means associated with certain of the hooks to take up slack in the chain.

2. A tire chain appliance of the class described comprising two anchoring rings, means attaching said rings to a vehicle wheel on opposite sides of the rim, each ring having inwardly directed projections at its inner edge, and a tire chain element adapted to encircle the tire and presenting two side chains extending the length thereof and cross chains connecting the side chains, said side chains having at their ends hooks to hook over the inner edges of the rings between the projections thereon thereby anchoring said ends directly to the rings and holding each side chain end from creeping movement relative to the tire.

3. A tire chain appliance for vehicle wheels comprising two anchoring rings, means attaching said rings rigidly to the wheel on opposite sides of the rim, each ring having notches in its inner edge, and a tire chain having two side chains connected by cross chains, each side chain having a hook at each end to hook into a notch of the corresponding anchoring ring whereby each end of each side chain is anchored to and is held from creeping movement on the tire by the corresponding anchoring ring.

4. A tire chain appliance for vehicle wheels comprising two anchoring rings, means attaching said rings to the wheel on opposite sides of the rim, each ring having notches in its inner edge, a tire chain having two side chains connected by cross chains, each side chain having a hook at each end to hook into a notch of the corresponding anchoring ring, and a toggle connection between one of the hooks and the corresponding side chain.

5. A tire chain appliance for vehicle wheels comprising an anchoring ring attached to the wheel on one side thereof adjacent the rim, said anchoring ring having notches in its inner edge, and a tire chain element adapted to engage the tread portion of the tire, said tire chain element having two side chains and cross chains connecting the side chains, one side chain having at each end thereof a hook adapted to hook into one of the notches of the anchoring ring, and means for detachably anchoring the ends of the other side chain.

6. A tire chain appliance for vehicle wheels comprising an anchoring member rigidly attached to the wheel on one side thereof adjacent the rim, and a tire chain element adapted to engage the tread portion of the tire, said tire chain element having two side chains and cross chains connecting the side chains, one side chain having at each end thereof a hook and said anchoring member having stationary hook-anchoring portions to which the hooks may be detachably anchored, and means for detachably anchoring the ends of the other side chain, said hook-anchoring portions holding the side chain from creeping movement relative to the tire.

7. A tire chain appliance for a vehicle wheel comprising two anchoring members, means attaching said members rigidly to the wheel on opposite sides of the rim, each anchoring member having notches in its inner edge, and a tire chain having two side chains connected by cross chains, each side chain having a hook at each end to hook into a notch of the corresponding anchoring member, whereby each end of each side chain is anchored to and is held from creeping movement on the tire by the corresponding anchoring member.

8. A tire chain appliance for vehicle wheels comprising an anchoring member rigidly attached to the wheel on one side thereof adjacent the rim, said anchoring member having notches in its inner edge, a tire chain element adapted to engage the tread portion of the tire, said tire chain element having two side chains and cross chains connecting the side chains, one side chain having at each end thereof a hook adapted to hook into one of the notches of the anchoring member, and means for detachably anchoring the ends of the other side chain.

HERBERT N. RIDGWAY.